Patented July 24, 1928.

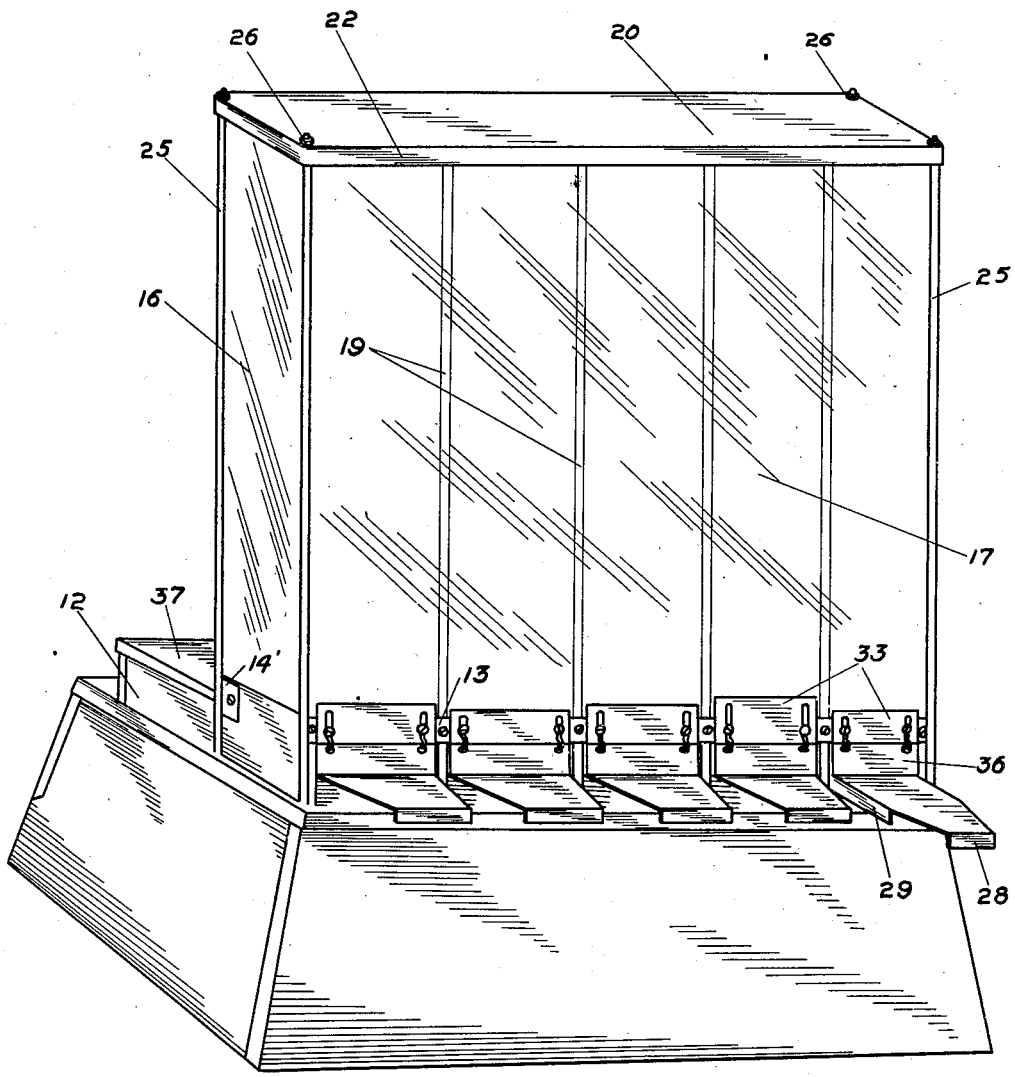

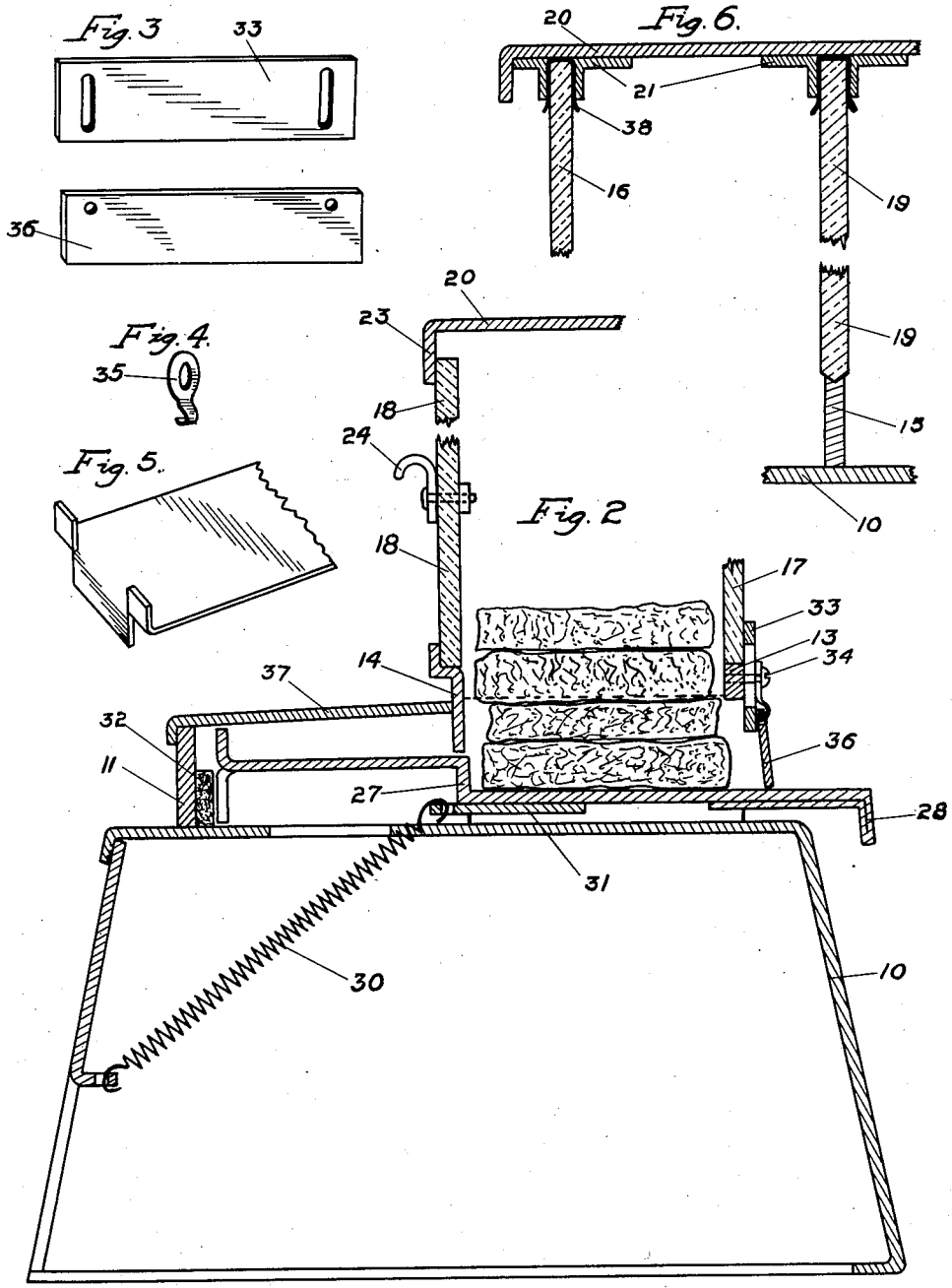

1,677,938

UNITED STATES PATENT OFFICE.

WILTON VAN SICKLE, OF LINCOLN, NEBRASKA.

SERVER FOR SLICES OF BREAD AND THE LIKE.

Application filed June 24, 1924, Serial No. 722,101. Renewed April 12, 1928.

My invention relates to devices for serving or dispensing slices of bread and the like in cafeterias and similar places of business where the patrons serve themselves.

The usual practice in serving bread in cafeterias is to place the bread slices on a tray and to cover the slices with a towel and to place the tray where the patron can help himself while gathering the various articles of food for his lunch. Bread so placed tends to dry out on the surface and when it is slightly dried in this manner it is apt to be rejected by the patron. After the slices have been picked up and rejected by a number of patrons they become so unattractive that they must be thrown away. The waste from this source with the tray method of serving, is estimated to be at least twenty per cent. The objections to the unsanitary features of the tray service are even greater than the objections to the waste.

In brief, the object of my invention is the provision of a server which is perfectly sanitary, and from which the bread may be served without any waste whatever. It is also one of my objects to so design the server that cookies, doughnuts, slices of cake and sandwiches may be dispensed therefrom. Furthermore it is my object to make the server in the form of a very ornamental article of cafeteria furniture which can be made and sold at a price which is very attractive when considered with regard to the savings which it effects.

Having in view these objects and others which will be mentioned in the description, I will now refer to the drawings, in which Figure 1 is a view in perspective of my server.

Figure 2 is a cross section of the base, lower portion and back of the server.

Figure 3 is a view in perspective of both the gate and the plate for adjusting the size of the opening through which the slices of bread are withdrawn.

Figure 4 is a view in perspective of the gate hinge.

Figure 5 is a view in perspective of the rear portion of the slide.

Figure 6 is a sectional view showing the means for securing the partitions at their upper and lower edges.

The server rests on or rather is secured to a base 10 which raises the operative parts of the server to a convenient height above the table or counter or other support. The base is hollow, a portion of the back and the entire bottom being open. The hollow portion of the base receives the springs which return the slides and it also serves as a receptacle for the crumbs which work off from the bread slices.

Of the server proper, the bottom rear wall 11 and the bottom side walls 12 are rigidly secured to the base 10 on the upper surface thereof. The forward portions of the side walls 12 are wider than the rearward portions. Walls 13 and 14 are also provided for the bottom portion of the server proper but both of these walls have their lower edges spaced from the base 10. The front wall 13 is in the form of a bar uniting the front upper corners of the two side plates 12. The rear wall 14 is in the form shown in section in Figure 2, having a shoulder which serves as a seat for the closure at the back of the server. The wall 14 is also provided with two ears 14′ whereby the wall 14 is secured by welding or otherise to both of the side walls 12 at the rear edges of the widest portions thereof. Partition walls 15 are also secured to the base 10, these partition walls serving as supports for the glass partitions between the compartments.

The construction thus far described is integral since all of the parts are united by welding or soldering. Furthermore, they are heavily plated with nickel or the like, which still further obliterates the seams or joints. The wall 12 may be made from one strip of metal and without a vertical joint or it may be made of two separate parts. In the latter case the forward part is similar in form to the partitions 15.

The upper edges of the partitions are concave as shown in Figure 6 as are also the upper edges of the forward portions of the side walls 12. The bread receptacle is rectangular in section, having glass walls 16 at its two sides, a glass wall 17 in its front and a glass wall 18 at its rear, the rear wall 18 being removable to give access to the interior of the receptacle. The partition walls 19, also made of glass plates, divide the receptacle into compartments. The metal cover 20 covers the receptacle. My server embodies a number of novel features in the structures for assembling these parts in rigid relation.

The partition plates 15 as well as the forward portions of the side plates 12 have concave upper edges and the glass end walls 16 and partitions 19 have convex lower edges so that when the end walls 16 and partitions 19 are in place they are interlocked at their lower edges with their respective supports. The top cover 20 is provided on its under surface with pairs of angle members 21, the members of each pair being spaced so as to receive therebetween the upper edge of an end wall 16 or of a partition 19. The top cover 20 is also provided with downwardly projecting flanges 22 annd 23 at its front and rear respectively. The front glass wall 17 rests on the bar 13 and its upper edge bears against the flange 22 which prevents outward displacement, inward displacement being prevented by the forward edges of the partitions 19. The rear wall 18 is seated in the shoulder of its support 14 and its upper edge bears against the flange 23. The rear wall 18, as shown in Figure 2, is so proportioned that it can be lifted to clear the lower flange so that it can be removed to give access to the interior of the receptacle as when refilling one or more of the compartments. For convenience in removing the rear wall 18, I provide a hook 24 which facilitates the handling of the glass wall.

At each corner of the bread receptacle is a rod 25 extending through the top cover 20 and through the top of the base 10. The upper projecting portion of each rod 25 is screw threaded and is provided with a nut 26. When thus assembled all of the parts are so rigidly and firmly united that no part can be displaced with the roughest treatment which the server is likely to receive. When it is desired to clean the partitions and walls however, these parts may be easily and quickly removed by simply removing the four nuts 26.

The slices of bread are delivered through an opening in the bread receptacle below the bar 13. For thus delivering the slices individually without their being touched by the hands, I provide a delivery slide 26. The slide 26 extends through the bread receptacle and to the back wall of the chamber in the rear of the bread receptacles, and it has an angled vertical wall 27 which is positioned in substantial alignment with the wall 18 when the slide is at rest. For actuating the slide, its forward end is downturned at 28 and is preferably folded upon itself as shown in Figure 2. The slides are also turned down at their lateral edges at 29 to provide runners. The slide is drawn forward by grasping it with the thumb and forefinger but it is retracted by the spring 30 which is secured to a fixed part of the base 10 and to a spring support 31 on the slide. The slide is both upturned and downturned at its rear end as shown in Figures 2 and 5. When the slide is drawn forward the upturned ears at the rear end of the slide engage the downwardly projecting portion of the wall 14 to limit the forward movement of the slide. The spring 30 retracts the slide rather forcibly and to prevent injury to the various parts the downturned ear at the rear end of the slide is caused to engage a resilient buffer 32 to absorb the shock.

The delivery openings at the front of the receptacles are wide enough to permit the passage therethrough of sandwiches or doughnuts or other food articles having considerable thickness. If however the receptacles were filled with thin slices of bread or the like, these openings would be found to be so wide as to let through two or more slices of bread at a time with the possibility of causing choking in the delivery. In order to avoid these difficulties I adjust the width of the openings by means of the plate 33, the plate being provided with slots through which the screws 34 pass for holding the plate in adjusted position. The screws 34 also support the hinges 35 to which the gate 36 is pivotally connected. The hinge 35 and the gate 36 thus have fixed positions regardless of the adjustment of the plate 33, the result being that at all times the gate is adapted to entirely close the opening regardless of the adjustment in the size of the opening.

The cover 37 is adapted to close the opening in the rear part of the server. The cover is flanged on its rear and lateral edges and is made removable so as to give access to the interior. The top wall of the base 10 is provided with an aperture 39 for receiving bread crumbs which are carried rearwardly under the action of the spring. The lower portion of the rear wall of the base 10 is left open, the construction making it possible to introduce receptacles under the apertures 39 for receiving the bread crumbs.

From the foregoing description it will be seen that the slices of bread are delivered to the patron in perfectly sanitary condition since they cannot be handled by other patrons. Until delivery of the bread slices, they are in contact with metal and glass only, both of which are easily maintained in sanitary condition. The structure of the server is such that all of the parts may be individually removed so that they can easily be cleaned. The use of the server also eliminates entirely the waste of bread and other pastries which reaches very large proportions in the ordinary methods of serving bread. The bread slices are kept in a closed container, even the outlet being normally closed, so that there is no waste from the bread drying out. Even the crumbs which are nearly always regarded as waste, are segregated in my server and are kept in such condition that they can be easily used in the kitchen. The greatest saving however is due to the fact that the slices of bread cannot be repeatedly handled and thus fouled by the patrons.

In my drawings I have shown the server with six compartments, but it is obvious that the number of compartments may be varied as desired. The rear wall 18 which also serves as a door for the rear opening, is made of heavy plate glass. To facilitate the ease of handling it when refilling the compartments, I construct the rear wall 18 in the form of two or more sections, depending on the number of compartments in the server. When there are three or less of these compartments a single piece of glass will be found to be light enough for convenient handling. When the rear wall 18 is formed in sections the meeting edges of the sections are positioned in alignment with the edge of a partition wall 19.

Having thus described my invention in terms which will be readily understood by others skilled in the art to which it pertains, what I believe to be new and desire to secure by Letters Patent of the United States is:—

In a serving machine for slices of bread and like articles, a base, a receptacle on the base for housing slices of bread in a vertical stack, a slide on the base in the lower end of the receptacle to traverse the bottom of said stack, said slide comprising a flat member offset intermediate its ends to provide a lower fore part and a raised rear part with a forwardly facing shoulder therebetween, said receptacle having a stepped rear wall providing a housing for the raised rear part of the slide, the upper part of the rear wall projecting into the housing into close proximity to the side, said raised rear part having upwardly extending projections at its rear edge for movement in said housing between said projecting portion of the upper part of the rear wall and the lower part thereof to limit the movement of the slide, a spring between the base and the slide for normally urging the latter backwardly and holding said shoulder of the slide in registry with said projecting portion of the upper part of the rear wall of the receptacle, and means on the front wall of the receptacle adjustably spaced above the base for admitting a slice of bread of desired thickness to pass from beneath the stack on the fore part of the slide.

In testimony whereof I affix my signature.

WILTON VAN SICKLE.